United States Patent [19]
Matthews et al.

[11] Patent Number: 5,644,789
[45] Date of Patent: Jul. 1, 1997

[54] SYSTEM AND METHOD FOR HANDLING I/O REQUESTS OVER AN INTERFACE BUS TO A STORAGE DISK ARRAY

[75] Inventors: Randy J. Matthews; Wade A. Dolphin, both of Boise, Id.

[73] Assignee: Hewlett-Packard Company, Palo Alto, Calif.

[21] Appl. No.: 376,944

[22] Filed: Jan. 19, 1995

[51] Int. Cl.$^6$ .......................... G06F 13/00; G06F 12/00
[52] U.S. Cl. ................. 395/856; 395/497.01; 395/441; 395/876
[58] Field of Search .................... 395/837, 859, 395/872, 876, 878, 404, 439, 440, 441, 474, 478, 494, 497.01, 497.02, 497.03, 856

[56] References Cited

U.S. PATENT DOCUMENTS

| | | | |
|---|---|---|---|
| 4,325,120 | 4/1982 | Colley et al. | 395/412 |
| 5,109,336 | 4/1992 | Guenther et al. | 395/497.02 |
| 5,155,835 | 10/1992 | Belsan | 395/441 |
| 5,195,100 | 3/1993 | Katz et al. | 395/182.2 |
| 5,237,658 | 8/1993 | Walker et al. | 395/858 |
| 5,278,838 | 1/1994 | Ng et al. | 395/182.04 |
| 5,287,462 | 2/1994 | Jibbe et al. | 395/856 |
| 5,289,418 | 2/1994 | Youngerth | 365/201 |
| 5,297,258 | 3/1994 | Hale et al. | 395/441 |
| 5,313,585 | 5/1994 | Jeffries et al. | 395/411 |
| 5,481,702 | 1/1996 | Takahashi | 395/497.02 |

*Primary Examiner*—Matthew M. Kim

[57] ABSTRACT

A multi-tasking, multi-initiator computing system includes an interfacing bus, at least one storage disk array connected to the interfacing bus, and multiple initiators connected to the interfacing bus to request I/O processes to be performed by the storage disk array. A disk array controller is provided in the storage disk array to assign the I/O requests received from the initiators to one of two types of job control data structures: (1) regular job control data structures that hold the information to process and complete the I/O request, and (2) minimized job control data structures that are temporarily used when no regular job control data structures are available. The disk array controller assigns the I/O request to the minimized job control data structures only in the event that no free regular job control data structures are available to hold the information from the I/O request. Each minimized job control data structure holds a subset of the information from the I/O request that is sufficient to reinitiate the I/O request for completion when a regular job control data structure once again becomes available. A method for operating a computing system and a memory data structure are also described.

8 Claims, 4 Drawing Sheets

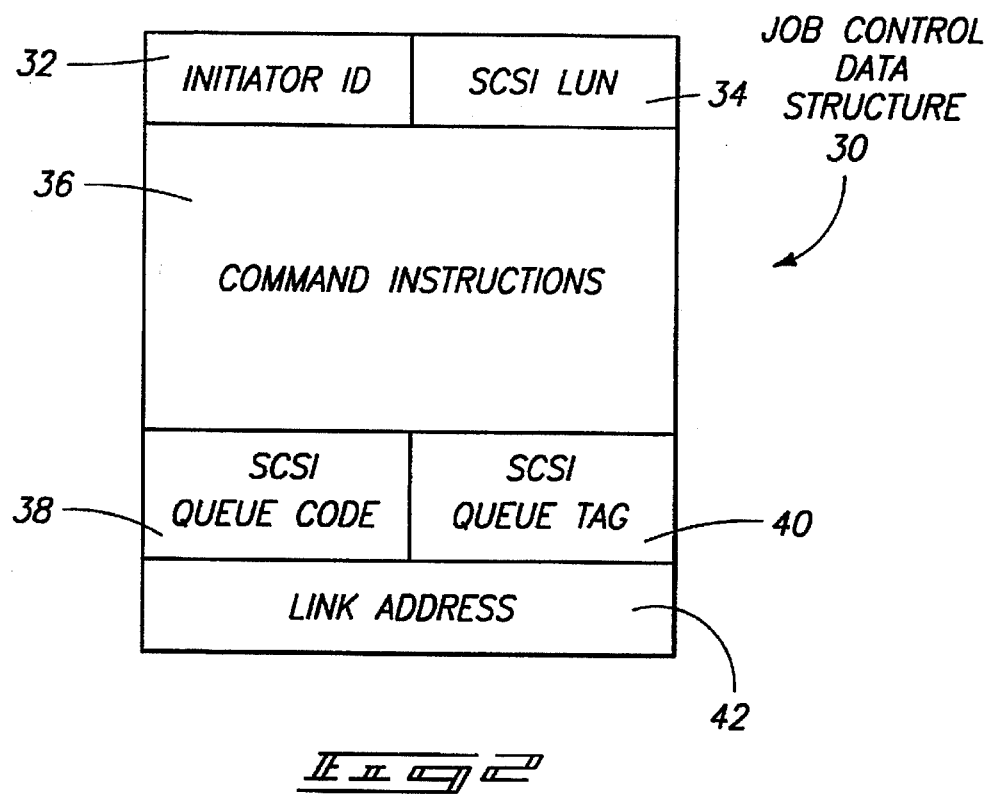
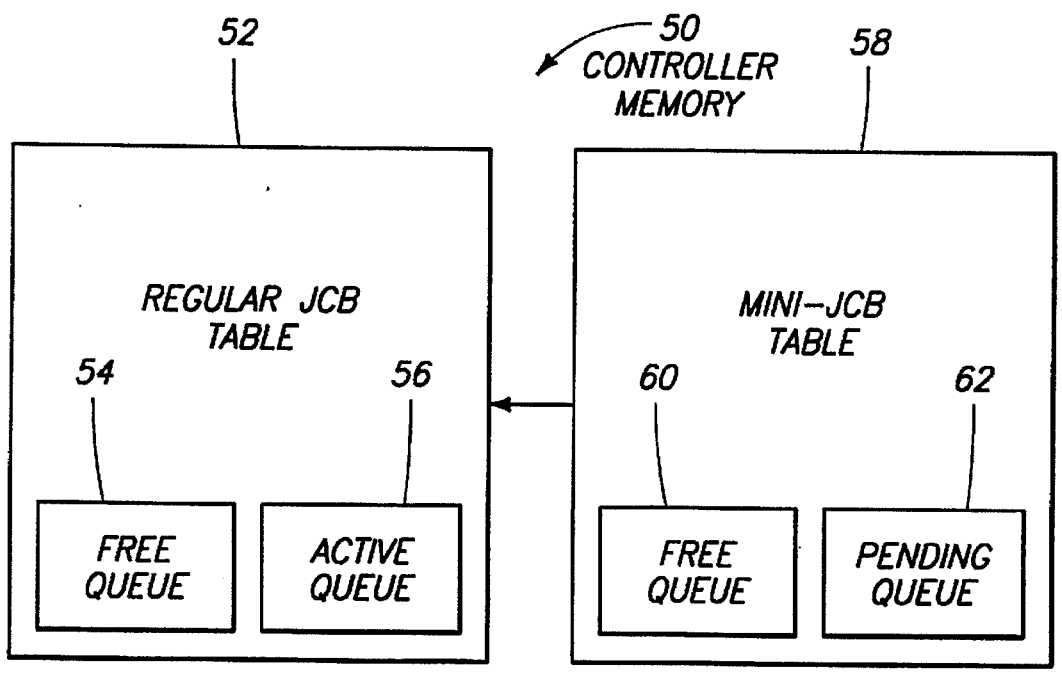

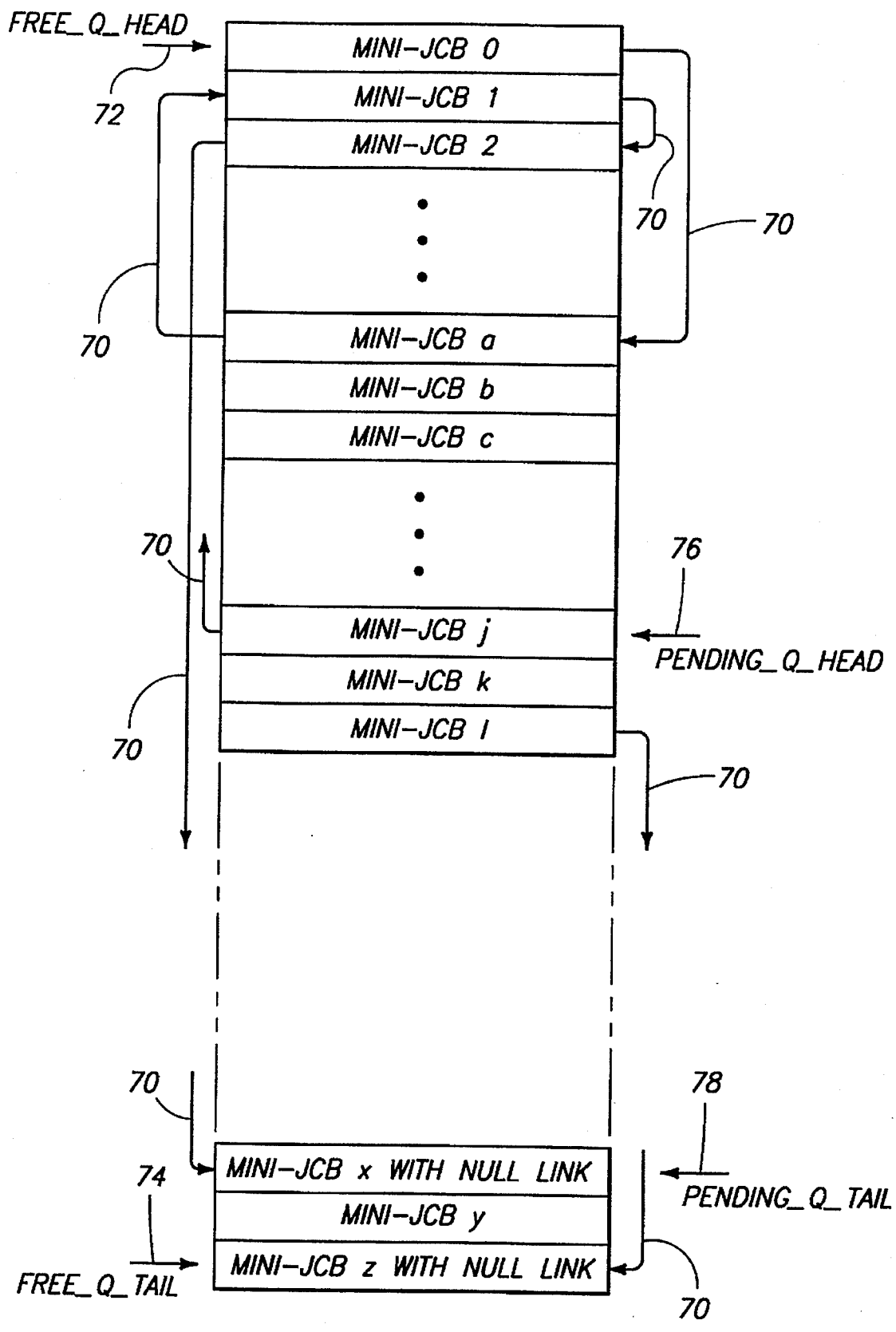

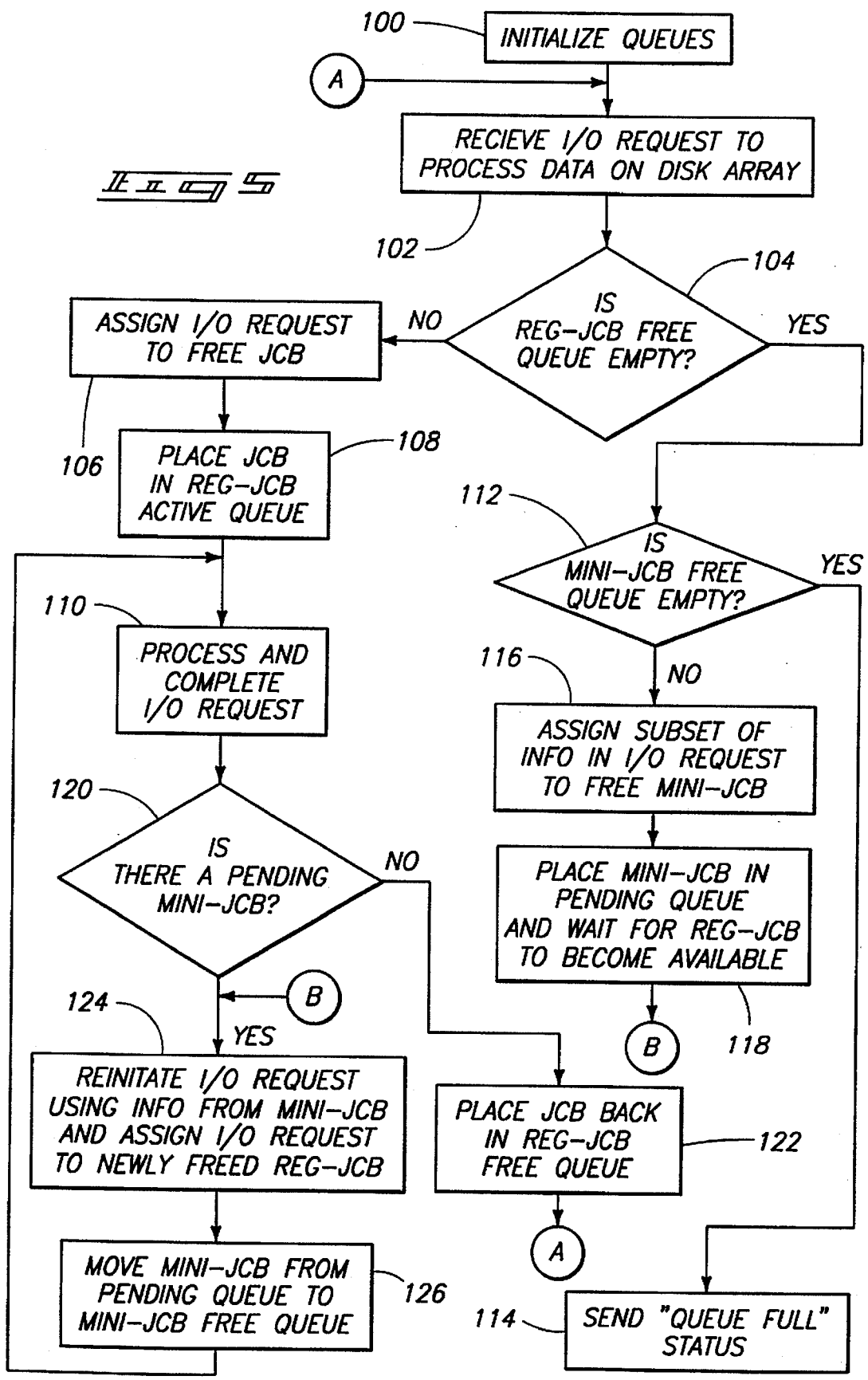

5,644,789

SYSTEM AND METHOD FOR HANDLING I/O REQUESTS OVER AN INTERFACE BUS TO A STORAGE DISK ARRAY

FIELD OF THE INVENTION

This invention relates to systems and methods for handling I/O requests over an interface bus to a storage disk array. This invention also relates to memory data structures used to temporarily hold a portion of the I/O requests until the I/O requests can be completed.

BACKGROUND OF THE INVENTION

In recent years, the popularity of small local area networks (LANs) having many "intelligent" computers interlinked by a local interfacing network has dramatically increased. This popularity is fueled by the rapidly evolving complexity and sophistication of computers and supporting software. Today's computers have tremendous processing speeds and storage resources that were not available a decade ago. As a result, LANs have become one preferred structure for small and medium size companies, often times replacing the mainframe architecture consisting of many "dumb" terminals connected to a centralized computer and storage center. Even large companies are shifting reliance from mainframes to the more flexible LANs.

As LANs evolve to support more and more users, there is an increasing need to provide storage systems having sufficient storage capacity to accommodate a large volume of data being stored by multiple users. These storage systems must be capable of timely handling an increasing number of I/O requests generated by the multiple users, while minimizing the time that such shared resources appear busy. Concurrent with these two goals is the ever present desire to provide storage systems that are not unduly expensive.

SUMMARY OF THE INVENTION

According to one aspect of this invention, a computing system is provided that efficiently handles a large volume of I/O requests in a multi-task, multi-initiator environment. More particularly, the computing system includes an interfacing bus, at least one storage disk array connected to the bus, and multiple initiators connected to the interfacing bus to request I/O processes to be performed by the storage disk array. The system further includes a disk array controller that is configured to assign the I/O requests received from the initiators to one of two types of job control data structures: (1) regular job control data structures that hold the information used to process and complete the I/O request; and (2) minimized job control data structures that are temporarily used when no regular job control data structures are available. Each minimized job control data structure holds a subset of the information from the I/O request that is sufficient to reinitiate the I/O request for completion when a regular job control data structure once again becomes available. The disk array controller preferably only assigns the I/O request to a minimized job control data structure in the event that no free regular job control data structure is available to hold the information from the I/O request.

The minimized job control data structures, at a preferred individual size of 16 bytes, are significantly smaller than the regular job control data structures at 1024 bytes. As a result, thousands of minimized job control data structures can be provided to store a minimum amount of information from the I/O requests at very little cost in terms of memory allocation.

According to another aspect, a method for operating a multi-tasking, multi-initiator computing system is provided. The method includes requesting I/O operations that contain information to process an I/O request on the storage disk array; assigning each I/O request to a corresponding regular job control data structure; and in the event that no free regular job control data structures are available to process the I/O request, assigning a subset of the information from the I/O request to a corresponding minimized job control structure where the subset of the information is sufficient to reinitiate the I/O request for completion.

According to yet another aspect of this invention, a data structure for holding a subset of information from an I/O request.

DESCRIPTION OF THE DRAWINGS

Preferred embodiments of the invention are described below with reference to the following accompanying drawings depicting examples embodying the best mode for practicing the invention.

FIG. 2 shows one type of job control data structure used in controller memory of the storage system according to an aspect of the present invention.

FIG. 3 is a block diagram of controller memory in the storage system of FIG. 1 that is used to maintain two types of job control data structures according to an aspect of this invention.

FIG. 4 shows the job control data structures of FIG. 2 arranged in a table.

FIG. 5 is a flow diagram of preferred steps according to a method for operating a SCSI-based computing system according to another aspect of this invention.

DETAILED DESCRIPTION OF THE INVENTION

Figure 1:
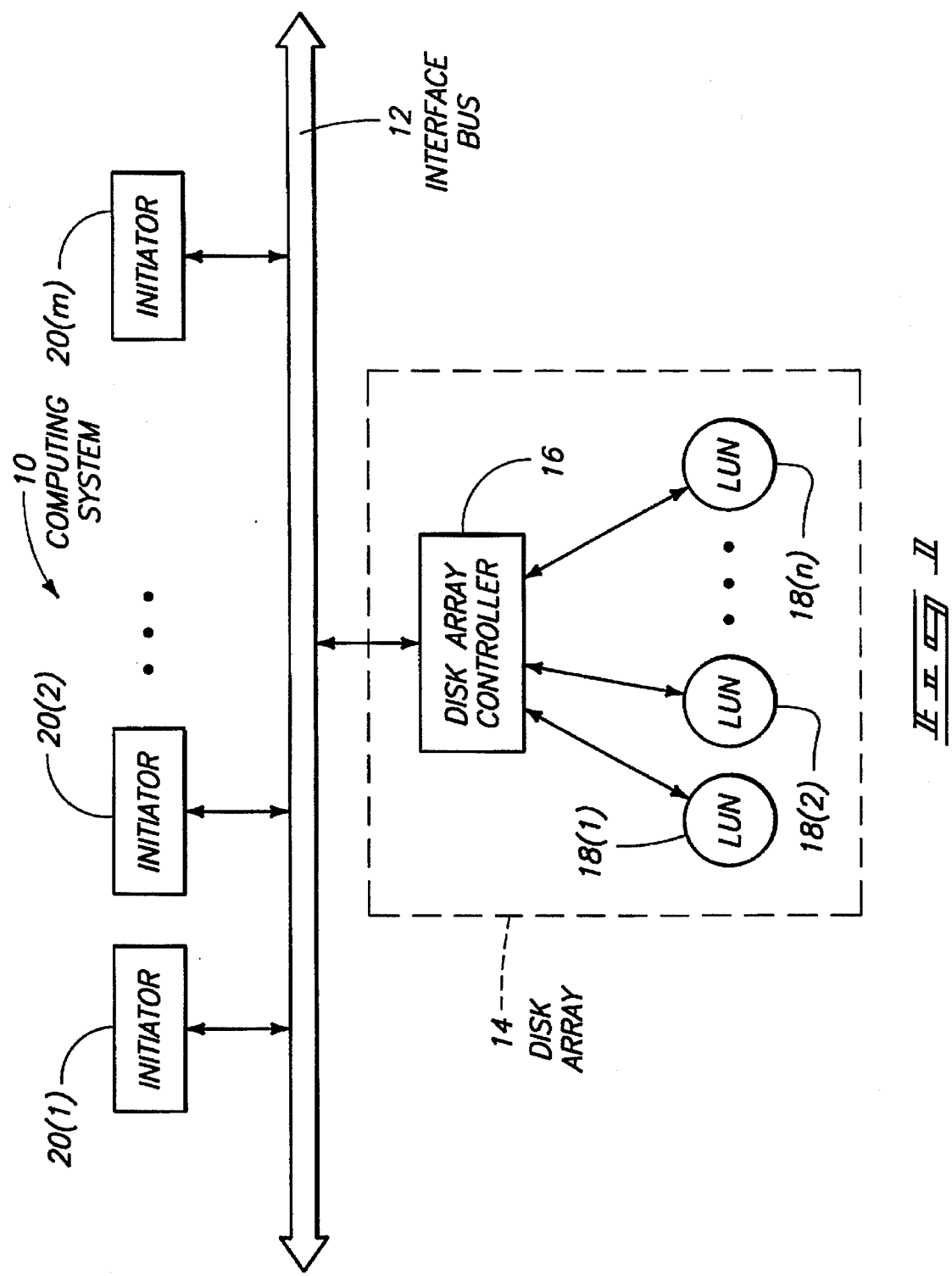
FIG. 1 is a diagrammatic illustration of a computing system having multiple initiators coupled to a storage system via a SCSI bus.

FIG. 1 shows a multi-tasking, multi-initiator computing system 10. Computing system 10 includes an interface bus 12, at least one storage disk array 14 connected to the bus, and multiple initiators 20(1), 20(2) . . . 20(m) connected to the bus. Bus 12 is preferably a SCSI (Small Computer System Interface) type interface bus that is commonly used in computers and network systems. The reader of this disclosure is presumed to have a working knowledge of SCSI-based systems and terminology because many of the terms used herein are understood in the SCSI context.

Storage disk array 14 is provided to store data for use by any one of the multiple initiators. Disk array 14 includes a disk array controller 16 connected to the SCSI bus and multiple LUNs (Logical UNits) 18(1), 18(2), . . . 18(n) attached to the controller. In the preferred implementation, eight LUNs are defined by the disk array controller 16. Each LUN is a software defined view of physical or virtual storage disks within the disk array as seen from the initiators or host computers. The LUNs are managed by the disk array controller 16.

According to an example implementation, storage disk array 14 might be physically configured with twelve active mechanical bays to accommodate twelve storage disks. Example sizes of these storage disks are one to three Gigabytes. The storage disks can be independently connected or disconnected to mechanical bays. Four internal SCSI buses are used to interface the bays with disk array controller 16 (i.e., one bus per three mechanical bays). If the active bays are fully loaded, the data storage system has an example combined capacity of 12-36 Gigabytes.

Initiators 20(1)-20(m) are devices connected to a SCSI bus to request I/O processes to be performed by another "target" device connected to the SCSI bus. In the illustrated embodiment, the "target" device is the storage disk array 14. The initiators are preferably resident in one or more host computers which are coupled via SCSI bus 12 to share the resources of disk array 14. One anticipated implementation is providing disk array 14 as the common storage for a LAN that interconnects multiple different initiators. Preferably, the computing system accommodates fifteen different initiators.

Each I/O request sent by one of the initiators contains enough information to process data on the storage disk array. A typical I/O request includes the identity of the initiator, the LUN identity, address for location of information on disks, sector information, data buffer pointers, a command instruction, an identity of the instruction, and an instruction ordering information.

The disk array controller 16 is configured to assign the I/O requests received from the initiators 20(1)-20(m) to regular job control data structures, which are alternatively referred to herein as job control blocks (JCBs or Reg-JCBs). The regular job control data structures hold all of the information from the I/O request for processing data on the storage disk array. Typically, the regular job control data structures have a size of approximately 1024 bytes. One I/O request therefore maps into one job control block. In the multi-tasking, multi-initiator environment of this invention, one of fifteen initiators 20(1)-20(m) are independently sending one of a possible 256 unique commands to one of eight LUNs 18(1)-18(n). If one 1024-byte JCB were assigned to each possible permutation, a significant portion of memory (say, on the scale of 30 Megabytes) would need to be set aside just for JCBs. This is too much memory to reserve for holding such I/O requests.

Accordingly, in some systems, a fixed number of regular JCBs have been used to hold the information from the I/O request. The I/O requests are handled on a first come, first served basis, thereby establishing a race condition among the initiators competing for the common storage resource. When the number of I/O requests sent by different initiators exceed the fixed number, a Queue Full or Busy status is returned to the requesting initiator. The host computer or initiator is left to poll the common resource to determine when a free JCB has become available. This polling is expensive in terms of that host computer's bandwidth and is typically not performed. Thus, current implementations are often incomplete. Alternatively, the SCSI bus can be configured to retry periodically to determine if a free JCB has become available. Unfortunately, these forms of repeated attempts might be thwarted by another initiator getting to the free JCB before the polling or retry identifies a free JCB.

In view of these shortcomings in previous systems, an aspect of this invention is to provide a system that accommodates all of the I/O requests from the multiple initiators without resorting to race conditions, repetitive retries, and Queue Full messages. The system of this invention allows predictability in the multi-initiator environment by guaranteeing minimum queue depth for each initiator and LUN.

When no regular job control data structures are available, the disk array controller 16 assigns the I/O requests received from the initiators 20(1)-20(m) to minimized job control data structures, which are alternatively referred to herein as minimized job control blocks (or mini-JCBs). The minimized job control data structures are only temporarily used while no regular job control data structures are available. Each minimized job control data structure holds a subset of the information from the I/O request that is sufficient to reinitiate the I/O request for completion when a regular job control data structure once again becomes available. The minimized job control data structure is significantly smaller in size as compared to the regular job control data structure. Preferably, a mini-JCB has a size of 64 bytes or less, with 16 bytes being most preferred, as compared to 1024 bytes for the reg-JCB.

FIG. 2 shows a minimized job control data structure 30. It comprises a first field 32 for holding an identity of one of the initiators 20(1)-20(m) and a second field 34 for holding an identity of a location (e.g., SCSI LUN) within the storage disk array 14. The first and second fields are preferably one byte apiece. A third field 36 is provided for holding a command instruction provided by the initiator that is representative of an action to be performed by the storage disk array. In the preferred implementation, this third field is ten bytes. The mini-JCB 30 also has a one-byte fourth field 38 for holding an instruction ordering information (e.g., SCSI queue codes such as simple, head, or ordered). A one-byte fifth field 40 is provided to hold an identity of the instruction (e.g., SCSI queue tag) and a two-byte sixth field 42 is provided to hold a link address to a next minimized job control data structure. At a size of 16 bytes, the first through sixth fields hold sufficient information to reinitiate the I/O request but insufficient information to process data stored in the storage disk array.

In one preferred implementation, the disk array controller is configured with 64 reg-JCBs, which consumes 64K bytes of memory (i.e., 64×1024 bytes/JCB), and up to 4000 mini-JCBs, which consumes 64K bytes of memory (i.e., 4000×16 bytes/mini-JCB). The 128K bytes of memory used to support these structures is therefore substantially less than the 30 Megabytes that would otherwise be employed to provide a one-to-one mapping of reg-JCBs to every possible command/LUN/initiator combination.

FIG. 3 is a block diagram of controller memory 50 in the storage disk array controller 16. Controller memory 50 is configured to maintain the two types of job control data structures: reg-JCBs and mini-JCBs. Memory 50 includes a regular JCB table 52 which contains the regular job control data structures. A free queue 54 and an active queue 56 are provided to keep track of the reg-JCBs. Every reg-JCB will be on either the JCB free queue 54 or the JCB active queue 56. The JCB free queue 54 is initialized to the maximum number of reg-JCBs (e.g., 64), whereas the JCB active queue 56 is initialized as empty.

Controller memory 50 also includes a minimized JCB table 58 which contains the minimized job control data structures. Mini-JCB table 58 has a mini-JCB free queue 60 and a mini-JCB pending queue 62 which account for all mini-JCBs. Every mini-JCB in table 58 is linked to either the mini-JCB free queue 60 or to the mini-JCB pending queue 62, but not both at the same time. The mini-JCB free queue 60 is initialized to the maximum number of available mini-JCBs (e.g., 4000) and the mini-JCB pending queue 62 is initialized as empty.

FIG. 4 shows a preferred construction of mini-JCB table 58. Table 58 is a single dimensional array of minimized job control data structures, represented as mini-JCB 0 through mini-JCB z. It represents a pool of mini-JCBs that are available to any initiator and LUN. There are preferably no reserved mini-JCBs for any given initiator or LUN so that the system can adapt to the varying demands imposed by the multiple host computers connected to the interfacing bus.

The mini-JCB table 58 is indexed from three sources. First, each mini-JCB has a link address 42 (FIG. 2) which identifies a next mini-JCB. These internal pointers are depicted in FIG. 4 as arrows 70. It is noted that the mini-JCB at the tail of a linked list has a NULL link entry since there is no subsequent mini-JCB.

A second source for indexing the mini-JCB table is through pointers that represent the mini-JCB free queue 60 (FIG. 3). These pointers include a mini-JCB Free_Q_Head 72 and a mini-JCB Free_Q_Tail 74. The mini-JCB free queue 60 is initialized with all mini-JCBs in the table chained together, including the last mini-JCB having the NULL link entry. When a mini-JCB is needed, the mini-JCB at the head of the mini-JCB Free_Q_Head 72 is allocated, such as mini-JCB 0. The subset of information from the I/O request is entered into the mini-JCB 0. The mini-JCB 0 is then placed in the mini-JCB pending queue 62. In the rare event that the mini-JCB free queue is empty, indicating that all 4000 mini-JCBs are pending, a Queue Full status message is sent to the initiator sending the command.

A third table indexing source are the pointers that represent the mini-JCB pending queue 62 (FIG. 3). These pointers consist of mini-JCB Pending_Q_Head 76 and a mini-JCB_Pending_Q Tail 78. The pending queue 62 consists of all waiting mini-JCBs that contain the information subset to reinitiate the I/O request when a regular job control data structure becomes available. It is noted that the technique of using array entries to point to other array entries allows for multiple queues to thread through the table as needed.

The interaction and operation of the regular JCB table 52, with its corresponding queues 54 and 56, and the mini-JCB table 58, with its corresponding queues 60 and 62, will now be described in more detail with reference to the steps in FIG. 5, and the structures shown in FIGS. 3-4. At step 100, all four queues, are initialized as follows: the reg-JCB free queue 54 is initialized to the maximum number of reg-JCBs (e.g., 64), the reg-JCB active queue 56 is initialized as empty, the mini-JCB free queue 60 is initialized to the maximum number of available mini-JCBs (e.g., 4000), and the mini-JCB pending queue 62 is initialized as empty. At step 102, the disk array controller receives from an initiator an I/O request to process data on the disk array. If the reg-JCB free queue 54 is not empty (i.e., the "no" branch from step 104) indicating that one of the sixty-four regular-sized job control data structure is available, the I/O request is assigned to the free reg-JCB (step 106). The reg-JCB is moved from the free queue 54 and placed in the reg-JCB active queue 56 (step 108). The I/O request is then processed and completed (step 110).

With reference again to step 104, in the event that no free reg-JCBs are available and the reg-JCB free queue is empty (i.e., the "yes" branch from step 104) indicating that all sixty-four regular-sized job control data structures are presently active, it is determined whether there is a free mini-JCB to receive a subset of the information from the I/O request (step 112). In the rare instance that the mini-JCB free queue is empty indicating that all 4000 mini-JCBs are pending (i.e., the "yes" branch from step 112), a Queue Full status is returned to the initiator (step 114). In almost every situation, however, the mini-JCB free queue will not be empty and thus, a subset of the information from the I/O request is assigned to an available minimized job control structure (step 116). The newly filled mini-JCB is then transferred from the free queue 60 and placed in the mini-JCB pending queue 62 to wait for a reg-JCB to become available (step 118).

At step 120, when an I/O request is completed, the corresponding reg-JCB once again becomes free for use. The disk array controller checks to see if there are any mini-JCBs in the pending queue (step 120). If there is no pending mini-JCB (i.e., the "no" branch from step 120), the reg-JCB is placed back in the reg-JCB free queue 54 (step 122) where it awaits an I/O request, as indicated by flow branch "A".

If one or more mini-JCBs are pending (as indicated by flow branch "B" from step 118), a mini-JCB is assigned to the reg-JCB to reinitiate the I/O request using the minimal amount of information contained in the mini-JCB (steps 124). Preferably, the pending mini-JCBs are assigned to newly available reg-JCBs in FIFO (First In, First Out) order, regardless of LUN or initiator priority. If the mini-JCBs are dequeued in a less preferred order other than FIFO, some means of avoiding starvation will be included. At step 126, the mini-JCB is moved from the pending queue 62 back to the free queue 60.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A multi-tasking, multi-initiator computing system comprising:

an interfacing bus;

at least one storage disk array for storing data, the storage disk array being connected to the interfacing bus;

multiple initiators connected to the interfacing bus to request I/O processes to be performed by the storage disk array, each I/O request containing information to process the I/O request; and a disk array controller provided in the storage disk array, the disk array controller being configured to assign the I/O requests received from the initiators to one of two types of job control data structures: (1) regular job control data structures that hold the information to process and complete the I/O request, and (2) minimized job control data structures that are temporarily used when no regular job control data structures are available, each minimized job control data structure holding a subset of the information from the I/O request that is sufficient to reinitiate the I/O request for completion when a regular job control data structure once again becomes available.

2. The computing system according to claim 1 wherein the regular job control data structures have a size of approximately 1024 bytes, and the minimized job control data structures have a size of approximately 16 bytes.

3. The computing system according to claim 1 wherein the disk array controller only assigns the I/O request to the minimized job control data structures in the event that no free regular job control data structures are available to hold the information from the I/O request.

4. The computing system according to claim 1 wherein the minimized job control data structures are arranged in a single dimensional array table.

5. The computing system according to claim 4 wherein the minimized job control data structures contain a link address to a next data structure.

6. The computing system according to claim 4 wherein the minimized job control data structures are maintained in one of two queues, a free queue containing all available unused minimized job control data structures and a pending queue containing all minimized job control data structures that are presently in use.

7. A method for operating a multi-tasking, multi-initiator computing system, the system having multiple initiators, at least one storage disk array, and an interfacing bus interconnecting the initiators and storage disk array, the method comprising the following steps:

provifing regular job control data structures and minimized job control structures;

requesting I/O operations that contain information to process an I/O request on the storage disk array;

assigning each I/O request to a corresponding regular job control data structure, the regular job control data structure holding the information for processing the I/O request within the storage disk array; and in the event that no free regular job control data structures are available to process the I/O request, assigning a subset of the information from the I/O request to a corresponding minimized job control structure, the subset of the information being sufficient to reinitiate the I/O request for completion.

8. The method according to claim 7 further comprising reinitiating the I/O request using the subset of information held in the minimized job control structure when a regular job control data structure becomes available to hold all of the information from the I/O request for processing data on the storage disk array.

* * * * *